(12) United States Patent
Dong et al.

(10) Patent No.: US 8,750,541 B1
(45) Date of Patent: Jun. 10, 2014

(54) PARAMETRIC ARRAY FOR A HEAD-MOUNTABLE DEVICE

(71) Applicant: Google Inc., Mountain View, CA (US)

(72) Inventors: Jianchun Dong, Mountain View, CA (US); Eliot Kim, Mountain View, CA (US); Mitchell J. Heinrich, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/665,469

(22) Filed: Oct. 31, 2012

(51) Int. Cl.
*H04R 25/00* (2006.01)

(52) U.S. Cl.
USPC ............ 381/182; 381/370; 381/374; 381/310

(58) Field of Classification Search
USPC .......................................... 381/182–186, 310
See application file for complete search history.

(56) References Cited

U.S. PATENT DOCUMENTS

| | | | |
|---|---|---|---|
| 6,532,292 B1 * | 3/2003 | Lygas | 381/74 |
| 6,746,402 B2 | 6/2004 | Ustuner | |
| 7,130,430 B2 | 10/2006 | Milsap | |
| 7,146,011 B2 | 12/2006 | Yang et al. | |
| 7,190,378 B2 | 3/2007 | Sauer et al. | |
| 8,000,170 B2 | 8/2011 | Kablotsky | |
| 8,040,292 B2 * | 10/2011 | Ronzani et al. | 345/8 |
| 2003/0215103 A1 * | 11/2003 | Norris et al. | 381/77 |
| 2006/0132382 A1 | 6/2006 | Jannard | |
| 2008/0159571 A1 * | 7/2008 | Hooley | 381/307 |
| 2008/0279410 A1 * | 11/2008 | Cheung et al. | 381/381 |
| 2010/0074460 A1 | 3/2010 | Marzetta | |
| 2010/0149073 A1 | 6/2010 | Chaum et al. | |
| 2011/0245670 A1 | 10/2011 | Tashiro et al. | |
| 2012/0075168 A1 | 3/2012 | Osterhout et al. | |

FOREIGN PATENT DOCUMENTS

WO    2011045613 A1    4/2011

OTHER PUBLICATIONS

Bajura, Michael et al., "Merging Virtual Objects with the Real World: Seeing Ultrasound Imagery within the Patient," Computer Graphics, 26; Jul. 2, 1992.

* cited by examiner

*Primary Examiner* — Curtis Kuntz
*Assistant Examiner* — Ryan Robinson
(74) *Attorney, Agent, or Firm* — McDonnell Boehnen Hulbert & Berghoff LLP

(57) ABSTRACT

An apparatus includes a head-mountable support structure, a transducer array coupled to the support structure, and a processor configured to control the transducer array to radiate ultrasonic waves toward an ear of a user of the head-mountable support structure. The ultrasonic waves are audible.

18 Claims, 5 Drawing Sheets

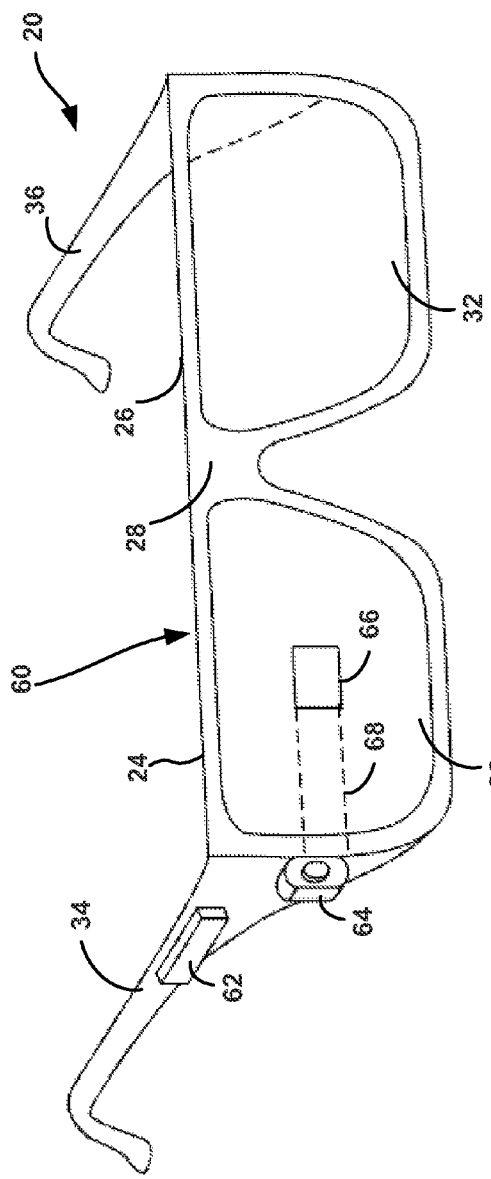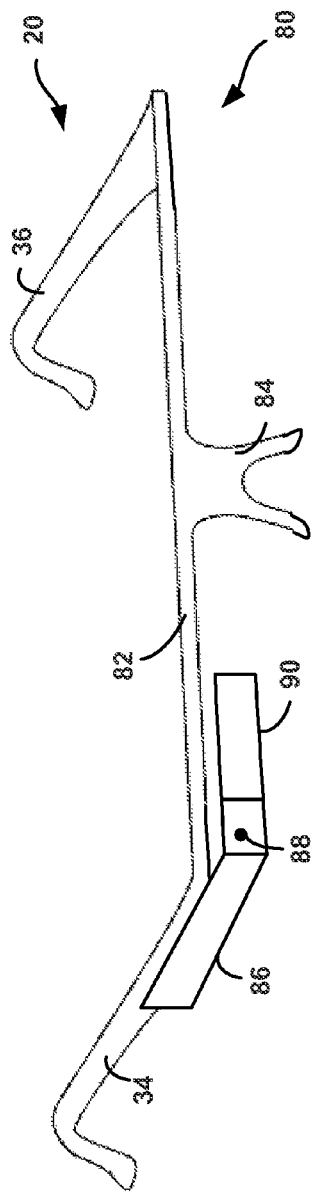

PARAMETRIC ARRAY FOR A HEAD-MOUNTABLE DEVICE

BACKGROUND

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

Further, the trend toward miniaturization of computing hardware, peripherals, as well as of sensors, detectors, and image and audio processors, among other technologies, has helped open up a field sometimes referred to as "wearable computing." In the area of sound generation, it has become possible to provide wearable speaker systems. Generally, known speaker systems utilize loudspeaker components to generate sound for the user. However, such loudspeaker components typically generate an angle of audible sound that can be nearly 360 degrees, which can result in the sound being heard by others besides the user of the speaker system. Improvements have been made to provide wearable speaker systems that provide more private sound intended only for the user of the speaker system. Such improvements include on-ear and in-ear headphones that are positioned in, on, or around the user's ear to provide sound isolation. Unfortunately, on-ear and in-ear headphones can be somewhat bulky and uncomfortable for the user. Further, some such sound isolation headphones, in particular, in-ear headphones, include a wide range of interchangeable in-ear pads made from different materials and having different shapes and sizes to accommodate different ear sizes and user preferences.

These examples for generating sound for a user are well-known and fairly effective. However, developments and changes in generating sound that can be heard substantially only by a particular user and that can be easily adjusted for different users are contemplated in the present disclosure.

SUMMARY

In one example, an apparatus includes a head-mountable support structure, a transducer array coupled to the support structure, and a processor configured to control the transducer array to radiate ultrasonic waves toward an ear of a user of the head-mountable support structure. The ultrasonic waves result in audible sound at the ear of the user.

In another example, a method includes controlling a transducer array coupled to a head-mountable support structure to radiate ultrasonic carrier waves toward an ear of a user of the head-mountable support structure and controlling the transducer array to radiate ultrasonic signal waves toward the ear of the user. The ultrasonic signal waves include audio signals. The method also includes producing a beam of audio sound from an interaction between the ultrasonic carrier waves and the ultrasonic signal waves. The beam of audio sound is radiated toward the ear of the user.

In yet another example, a head-mountable device includes a support structure and a transducer array coupled to the support structure. The transducer array includes at least a first ultrasonic transducer and a second ultrasonic transducer. The device also includes a processor configured to control the first transducer to radiate ultrasonic carrier waves toward an ear of a user of the head-mountable device and to control the second transducer to radiate ultrasonic signal waves toward the ear of the user. The ultrasonic signal waves includes audio signals and an interaction between the carrier waves and the signal waves results in a beam of audible sound directed to the ear of the user.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIG. 3 a generally front isometric view of another wearable computing system, similar to the system of FIG. 1.

FIG. 4 a generally front isometric view of another wearable computing system, similar to the system of FIG. 1.

DETAILED DESCRIPTION

I. Overview

Figure 1:
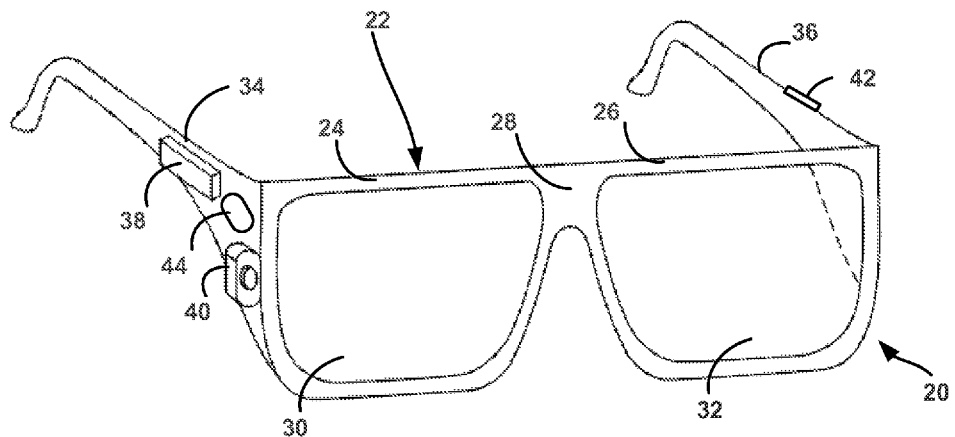
FIG. 1 is a generally front isometric view of a wearable computing system according to one example.

Embodiments described herein relate to a speaker system that can be coupled to a head-mountable support structure and that provides sound directed to an ear of the user of the support structure, such that the sound can be heard substantially only by the user. In one example, the speaker system includes a parametric transducer array configured to radiate ultrasonic waves toward the ear of the user in a manner that produces an audio signal that is audible to the human ear. Generally, the parametric array refers not necessarily to a shape of the transducer array but, rather, to a transducer array that is arranged such that the ultrasonic waves emitted by the transducers "interfere" with one another and are demodulated by the air through which the waves travel so as to form a directional sound wave that is audible to the human ear.

More specifically, ultrasonic waves are defined as having frequencies higher than the upper limit of human hearing (e.g., higher than about 20 kHz). However, ultrasonic waves can be modulated with or otherwise used to encode sound data and radiated through the air from a parametric array. The parametric array radiates ultrasonic waves with a relatively high intensity or sound pressure level (SPL) (e.g., an SPL of around 120 dB or greater) and utilizes the non-linear characteristic of air to distort and demodulate the ultrasonic waves as the waves travel through the air to convert the waves into audible sound waves. The high frequency of such ultrasonic waves and the corresponding short wavelength of the ultrasonic waves allow the waves to propagate in a much narrower focused beam as compared to audible sound waves that naturally spread out in all directions from a conventional loudspeaker. Illustratively, the beam of ultrasonic waves might have a beam angle between about 3-10 degrees. Consequently, the beam of ultrasonic waves is converted into a beam of audible sound waves as the ultrasonic waves are demodulated by the air. These audible sound waves can be heard only along the focused path of the beam, such that a listener outside of the beam does not hear the sound.

The ultrasonic waves radiated by the transducer array can take various forms. In one example, the speaker system generates a constant-tone ultrasonic carrier signal. The carrier signal may be modulated with audio signals, which may include music, speech, and any other sound. The speaker system applies the modulated carrier signal to the transducer array to radiate a modulated ultrasonic carrier wave and signal wave in a narrow beam along a desired projection path. The non-linear transmission characteristic of air demodulates the modulated carrier wave and signal wave to regenerate the audio signal along the projection path of the beam, which can be directed toward the ear of the user, for example.

In another example, a first transducer of the array is controlled to radiate an ultrasonic carrier wave and a second transducer of the array is controlled to radiate an ultrasonic signal wave, which includes audio signals or data. The ultrasonic carrier wave and the ultrasonic signal wave can be directed along a similar beam projection path, such as toward the ear of the user. In this example, the carrier wave and the signal wave interact along the projection path with each other and with the air through which the waves travel to generate a narrow beam of audible sound waves that can be directed toward the ear of the user so that only the user can hear the sound.

The present disclosure is also directed to a speaker system that can steer a beam of audible sound waves to different locations. In one example, the speaker system can steer a beam of ultrasonic waves that interact with air to generate audible sound waves, as described generally above. More particularly, in the present example, the speaker system can electronically steer the beam of ultrasonic waves within a relatively small area (e.g., an area around a user's ear from a perhaps less than few inches away). The speaker system can accomplish this tight beam steering due to the short wavelengths of ultrasonic waves. Referring to the examples above, the speaker system can adjust the amplitude and/or the phase of the carrier wave and the signal wave with respect to each other to modify the locations where the corresponding waves interact along the projection path of the ultrasonic beams to produce the beam of audible sound waves. In one implementation, this electronic steering can be used to direct the beam of audible sound waves to different locations so that the speaker system can be adjusted for the ears of different users.

The speaker systems described herein can also be configured with a head-mountable display (HMD), which has a relatively small display element configured to be disposed near a wearer or user's eye such that displayed information on the display element fills part or all of a field of view of the user. In the present example, an HMD can provide information that appears to a user as a normal sized image, such as might be displayed on a traditional display device, for example, a computer screen.

It should be understood that the above example and other examples described herein are provided for illustrative purposes. As such, the examples should not be construed as limiting the scope of the present disclosure. Further, while various examples are discussed herein with respect to HMDs, the concepts of the present disclosure are applicable to a wide variety of computing or audio devices.

II. Example Wearable Computing Devices

Referring now to FIG. 1, an example system 20 for receiving, transmitting, and/or displaying data to a user is shown in the form of a wearable computing device. While the system 20 of FIG. 1 is generally configured as an HMD 22 as an example of a wearable computing device, other types of wearable computing devices can additionally or alternatively be used. As illustrated in FIG. 1, the HMD 22 comprises frame elements, including lens frames 24, 26 and a center frame support 28, lens elements 30, 32, and extending side or support arms 34, 36. The center frame support 28 and the side arms 34, 36 are configured to secure the HMD 22 to a user's face via the user's nose and ears, respectively.

Each of the frame elements 24-28 and the side arms 34, 36 may be formed of a solid structure of plastic and/or metal, or may be formed of a hollow structure of similar material so as to allow wiring and component interconnections to be internally routed through the HMD 22. Other materials and designs may be possible as well.

One or more of the lens elements 30, 32 may be formed of any material that can suitably display a projected image or graphic. In one example, each of the lens elements 30, 32 are also sufficiently transparent to allow a user to see through the lens element. Combining these two features of the lens elements may facilitate an augmented reality display where a projected image or graphic is superimposed over a real-world view as perceived by the user through the lens elements 30, 32 so that the user can view the virtual window and the real world simultaneously.

The side arms 34, 36 may each be projections that extend away from the lens frames 24, 26, respectively, and may be positioned behind a user's ears to help secure the HMD 22 to the user. The side arms 34, 36 may further secure the HMD 22 to the user by extending around a rear portion of the user's head. Additionally or alternatively, for example, the system 20 may connect to or be affixed within a head-mounted helmet structure. Other possibilities exist as well.

The system 20 may also include an on-board computing system 38, a video camera 40, a sensor 42, and a finger-operable touch pad 44. The computing system 38 is shown to be positioned on the side arm 34 of the HMD 22 in FIG. 1. However, in other examples, the computing system 38 may be provided on other parts of the HMD 22 or may be positioned remotely from the HMD, for example, the computing system 38 can be coupled via a wired or wireless link to the HMD. The computing system 38 may include a processor and memory, for example. The computing system 38 may be configured to receive and analyze data from the video camera 40 and the touch pad 44 and to generate images for output by or on the lens elements 30, 32. In other examples, the computing system 38 may be configured to receive and analyze data from other sensory devices, user interfaces, or both.

In FIG. 1, the video camera 40 is shown positioned on the side arm 34 of the HMD 22. However, in other examples, the video camera 40 may be provided on other parts of the HMD 22. The video camera 40 may be configured to capture images at various resolutions or at different frame rates. Many types of video cameras with a small form-factor, such as those used in cell phones or webcams, for example, may be incorporated into various embodiments of the system 20.

Further, although FIG. 1 illustrates one video camera 40, more video cameras may be used and each camera may be configured to capture the same view or to capture different views. For example, the video camera 40 may be forward facing to capture at least a portion of the real-world view perceived by the user. Such forward facing image captured by the video camera 40 may then be used to generate an augmented reality where computer generated images appear to interact with the real-world view perceived by the user.

The sensor 42 is shown on the side arm 36 of the HMD 22. However, in other examples, the sensor 42 may be positioned on other parts of the HMD 22. The sensor 42 may include one or more components for sensing movement, such as one or more of a gyroscope or an accelerometer, for example. Further, the sensor 42 may include optical components such as an emitter and a photosensor for tracking movement of a user's eye. Other sensing devices may be included within, or in addition to, the sensor 42, or other sensing functions may be performed by the sensor.

The touch pad 44 is shown on the side arm 34 of the HMD 22. However, in other examples, the touch pad 44 may be positioned on other parts of the HMD 22. Further, more than one touch pad may be present on the HMD 22. Generally, the touch pad 44 may be used by a user to provide inputs to the device 22. The touch pad 44 may sense at least one of a position and a movement of a finger via capacitive sensing, resistance sensing, or a surface acoustic wave process, among other possibilities. The touch pad 44 may be capable of sensing finger movement in a direction parallel or planar to the pad surface, in a direction normal to the pad surface, or both, and may also be capable of sensing a level of pressure applied to the pad surface. The touch pad 44 may be formed of one or more translucent or transparent insulating layers and one or more translucent or transparent conducting layers. Edges of the touch pad 44 may be formed to have a raised, indented, or roughened surface, so as to provide tactile feedback to a user when the user's finger reaches the edge, or other area, of the touch pad. If more than one touch pad is present, each touch pad may be operated independently, and may provide a different function.

Figure 2:
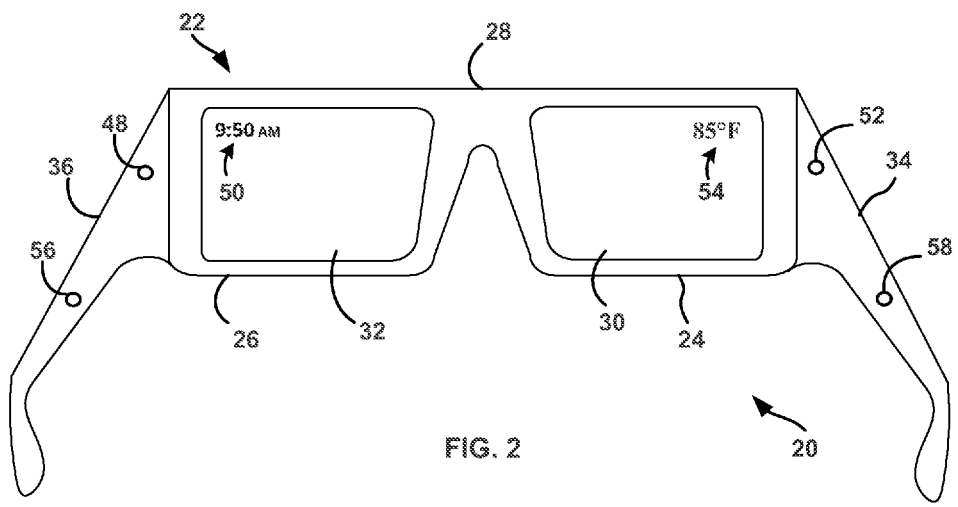
FIG. 2 is a generally back isometric view of the system of FIG. 1.

FIG. 2 illustrates an alternate view of the system 20 illustrated in FIG. 1. As shown generally in FIG. 2, the lens elements 30, 32 may act as display elements. The HMD 22 may include a first projector 48 coupled to an inside surface of the side arm 36 and configured to project a display 50 onto an inside surface of the lens element 32. Additionally or alternatively, a second projector 52 may be coupled to an inside surface of the side arm 34 and configured to project a display 54 onto an inside surface of the lens element 30.

The lens elements 30, 32 may act as a combiner in a light projection system and may include a coating that reflects the light projected onto them from the projectors 48, 52. In some embodiments, a reflective coating may not be used, for example, when the projectors 48, 52 are scanning laser devices.

In alternative embodiments, other types of display elements may also be used. For example, the lens elements 30, 32 may include a transparent or semi-transparent matrix display, such as an electroluminescent display or a liquid crystal display, one or more waveguides for delivering an image to the user's eyes, and/or other optical elements capable of delivering an in focus near-to-eye image to the user. A corresponding display driver may be disposed within or otherwise coupled to the frame elements 24-28, for example, for driving such a matrix display. Alternatively or additionally, a laser or LED source and scanning system could be used to draw a raster display directly onto the retina of one or more of the user's eyes. Other possibilities exist as well.

FIG. 2 also illustrates a first transducer array 56 disposed on the side arm 36 and a second transducer array 58 disposed on the side arm 34. The transducer arrays 56, 58, can be controlled by any suitable processor, such as the computing system 38. In one example, the transducer arrays 56, 58 are controlled by the computing system 38 to radiate beams of ultrasonic waves toward ears of a user of the HMD 22. The beams of ultrasonic waves include audio signals that are converted to audible sound through the interaction between the ultrasonic waves and the air. Utilizing the ultrasonic waves to carry the audio signals provides a beam of audible sound that can be heard substantially only by the user.

FIG. 3 illustrates another example system 20 for receiving, transmitting, and/or displaying data in the form of an HMD 60. The HMD 60 may include frame elements 24-28 and side arms 32, 34 such as those described with respect to FIGS. 1 and 2. The HMD 60 may additionally include an on-board computing system 62 and a video camera 64, such as those described with respect to FIGS. 1 and 2. The video camera 64 is shown mounted on the side arm 34 of the HMD 60. However, in other examples, the video camera 64 may be mounted at other positions as well.

The HMD 60 illustrated in FIG. 3 also includes a display 66, which may be coupled to the device in any suitable manner. The display 66 may be formed on a lens element of the HMD 60, such as the lens elements 30, 32 described with respect to FIGS. 1 and 2, and may be configured to overlay computer-generated graphics in the user's view of the physical world. The display 66 is shown to be provided generally in a center of the lens 30 of the computing device 60. However, in other examples, the display 66 may be provided in other positions. In the present example, the display 66 can be controlled by the computing system 62 that is coupled to the display via an optical waveguide 68.

FIG. 4 illustrates another example system 20 for receiving, transmitting, and displaying data in the form of an HMD 80. The HMD 80 may include side-arms 34, 36, a center frame support 82, and a bridge portion with nosepiece 84. In the example shown in FIG. 4, the center frame support 82 connects the side-arms 34, 36. The HMD 80 does not include lens-frames containing lens elements. The wearable computing device 80 may additionally include an on-board computing system 86 and a video camera 88, similar to those described with respect to FIGS. 1 and 2.

The HMD 80 may include a lens element 90 that may be coupled to one of the side-arms 34, 36 or the center frame support 82. The lens element 90 may include a display such as the display described with reference to FIGS. 1 and 2, and may be configured to overlay computer-generated graphics upon the user's view of the physical world. In one example, the lens element 90 may be coupled to an inner side of the side arm 34 that is exposed to a portion of a user's head when the HMD 80 is worn by the user. The lens element 90 may be positioned in front of or proximate to a user's eye when the HMD 80 is worn by a user. For example, the lens element 90 may be positioned below the center frame support 82, as shown in FIG. 4.

III. An Example Wearable Speaker System

Figure 5:
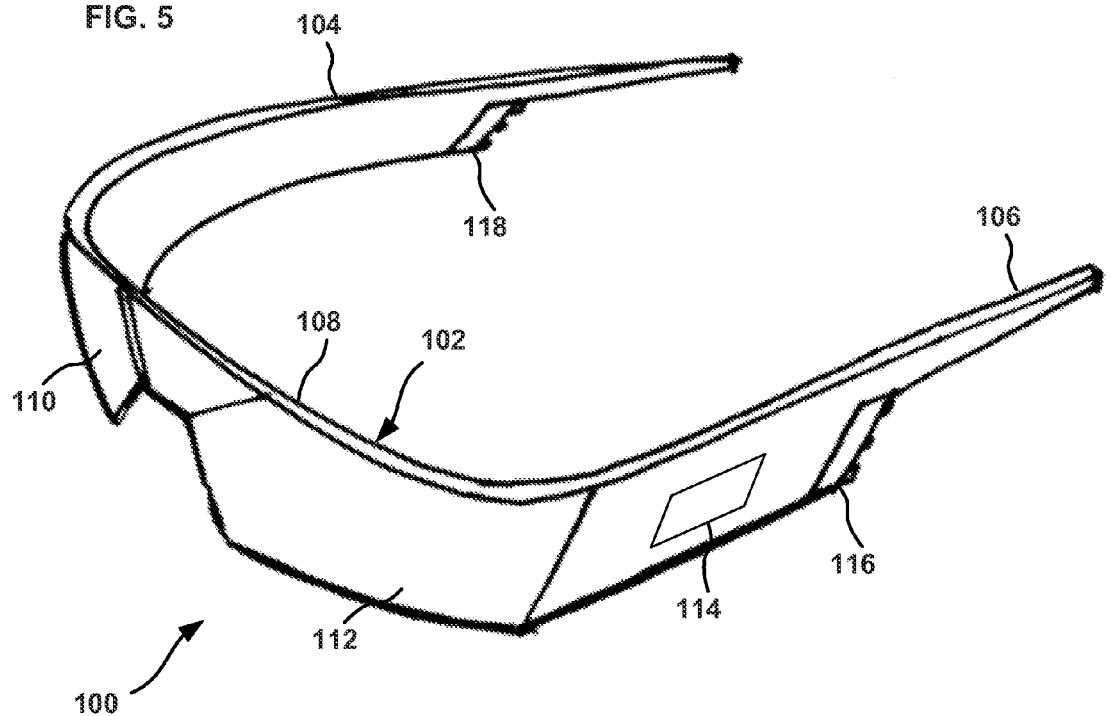
FIG. 5 is a generally front isometric view of a wearable speaker system.

Referring now to FIG. 5, another example is illustrated in the form of a wearable speaker system 100. In the present example, the system 100 includes a head-mountable support structure 102 having side-arms 104, 106 connected to a center frame support 108. The device 100 also includes lens elements 110, 112 coupled to the center frame support 108. The present example further includes an on-board computing system 114 and transducer arrays 116, 118, which are coupled to the side-arms 106, 104, respectively. As described above with respect to FIG. 2, the computing system 114 can be configured to control the arrays 116, 118 to radiate beams of ultrasonic waves toward ears of a user of the system 100.

Figure 6:
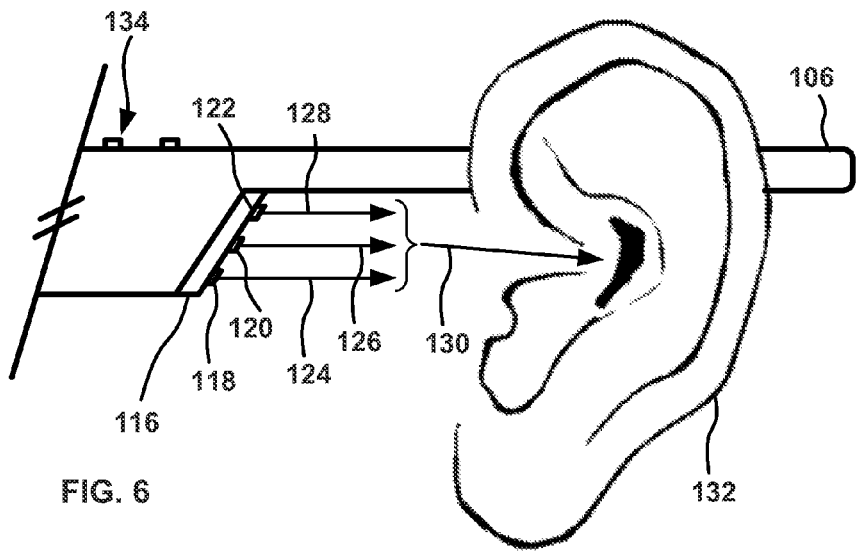
FIG. 6 is a partial side elevational view of the wearable speaker system of FIG. 5 worn by a user.

FIG. 6 illustrates another view of the system 100 and the transducer arrays 116, 118 (only array 116 illustrated in detail). In FIG. 6, the transducer array 116 includes transducers 118, 120, 122, which may take the form of ultrasonic piezoelectric transducers, electrostatic transducers, electrostrictive transducers, electro-thermo-mechanical film transducers, or polyvinylidene fluoride film transducers. The transducers 118-122 in FIG. 6 are generally arranged in a linear array. In other examples, the transducers 118-122 can be arranged in a curvilinear array or in other two-dimensional configurations.

The transducers 118-122 are configured to radiate beams of ultrasonic waves, represented by arrows 124, 126, 128, respectively. Illustratively, the transducer 118 can radiate a constant-tone ultrasonic carrier wave 124, which has a frequency between about 40-60 kHz, for example. In addition, the transducer 120 can radiate a signal wave 126 that includes audio data encoded thereon. Further, the transducer 122 can radiate another signal wave 128 that can include other frequency components of audio data from the signal wave 126. In another example, one or more of the ultrasonic waves 124-128 may each include a carrier wave that is modulated or combined with a signal wave that includes audio data.

In the example illustrated in FIG. 6, these ultrasonic waves 124-128 interact with each other and with the air to generate a beam of audible sound waves, represented by arrow 130. This beam of audible sound waves 130 is directed to an ear 132 of a user of the system 100. As illustrated in FIG. 6, the beams of ultrasonic waves 124-128 and the beam of audible sound waves 130 can originate from a position in front of the user's ear and radiate back toward the ear of the user. In one example, the beam of audible sound waves 130 can be directed toward an ear canal of the user to further minimize the possibility that someone other than the user can hear the audible sound waves.

More particularly, the ultrasonic waves 124-128 are demodulated by the non-linear characteristics of air, through which the waves travel. Further, the waves 124-128 generally interact with each other according to the principle of wave superposition, wherein two or more waves interact to produce another wave characterized primarily by frequencies that result from a subtraction of the frequencies of the original waves. Thus, for example, a carrier wave with a constant frequency of 40 kHz and a signal wave that encodes sound data between about 40.2-60 kHz can interact to produce a beam of audible sound waves having frequencies between about 200-20,000 Hz, which resides in the normal range of human hearing. Using these concepts, the signal wave can be controlled to interact with the carrier wave to reproduce the sound data encoded in the signal wave.

In yet another example, the system 100 is configured to steer or adjust the beam of audible sound waves 130 to be directed at the ear canal of different users. As described above, the audible sound waves 130 can be steered by adjusting the amplitude and/or phase of one or more of the ultrasonic waves 124-128 with respect to the other ultrasonic waves. In one example, a delay or phase offset can be applied to one or more of the ultrasonic waves 124-128 so that waves interact with one another to produce sound waves directed in a desired direction. Other techniques for steering the ultrasonic waves and resulting audible sound waves are known and can be utilized to implement the present disclosure.

FIG. 6 also illustrates a user input interface 134 that can receive user inputs to control the steering of the audible sound waves 130. Illustratively, the interface 134 may include buttons to adjust the beam 130 up or down. In other examples, the interface 134 may include a touch pad, such as the touch pad 44 of FIGS. 1 and 2, for steering the audible sound waves in one or more directions. Other examples are also possible.

In other examples, the system 100 of FIGS. 5 and 6 can include additional components, such as any of the components described with respect to FIGS. 1-4. Further, the transducer array 116 of FIGS. 5 and 6 may include additional or fewer transducers in other embodiments.

IV. Example Computer Network Infrastructure System

Figure 7:
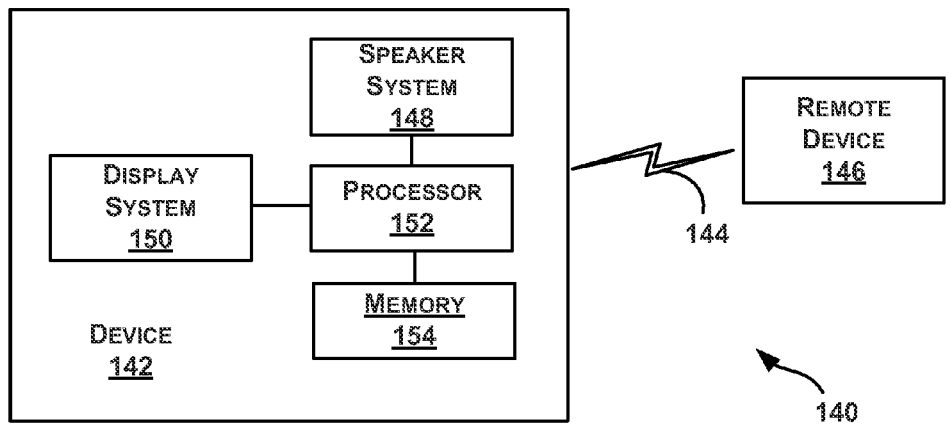
FIG. 7 is a block diagram of a computer network infrastructure, in accordance with one example.

FIG. 7 illustrates a schematic drawing of an example computer network infrastructure system 140. In the system 140, a device 142 communicates through a communication link 144, which can be a wired and/or wireless connection, to a remote device 146. The device 142 may be any type of device that can receive data and generate sound that can be heard substantially only by a user of the device. Further, the device 142 may be configured to display information to a user of the device. For example, the device 142 may be any of the devices of FIGS. 1-6.

Thus, the device 102 may include a speaker system 148 and a display system 150, both coupled to a processor 152. The speaker system 148 may include a parametric array of ultrasonic transducers. The processor 152 may receive audio data from the remote device 146 and configure the data for output via the speaker system 148. The display system 150 may include, for example, an optical see-through display, an optical see-around display, or a video see-through display. The processor 152 may receive data from the remote device 146 and configure the data for display on the display system 150. The processor 152 may be any type of processor, such as a micro-processor or a digital signal processor, for example.

The device 142 may further include on-board data storage, such as memory 154 coupled to the processor 152. The memory 154 may store software that can be accessed and executed by the processor 152, for example.

The remote device 146 may be any type of computing device or transmitter including a laptop computer, a mobile telephone, or tablet computing device, etc., that is configured to transmit data to the device 142 or otherwise communicate with the device. The remote device 146 and the device 142 may contain hardware to enable the communication link 44, such as processors, transmitters, receivers, antennas, etc.

In FIG. 7, the communication link 144 is illustrated as a wireless connection. However, in other examples wired connections may also be used. For example, the communication link 144 may be a wired serial bus, such as a universal serial bus or a parallel bus. A wired connection may be a proprietary connection as well. The communication link 144 may also be a wireless connection using, for example, Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 146 may be accessible via the Internet and may include a computing cluster associated with a particular web service, for example, social-networking, photo sharing, address book, etc.

V. Additional Details of an Example Computing System

Figure 8:
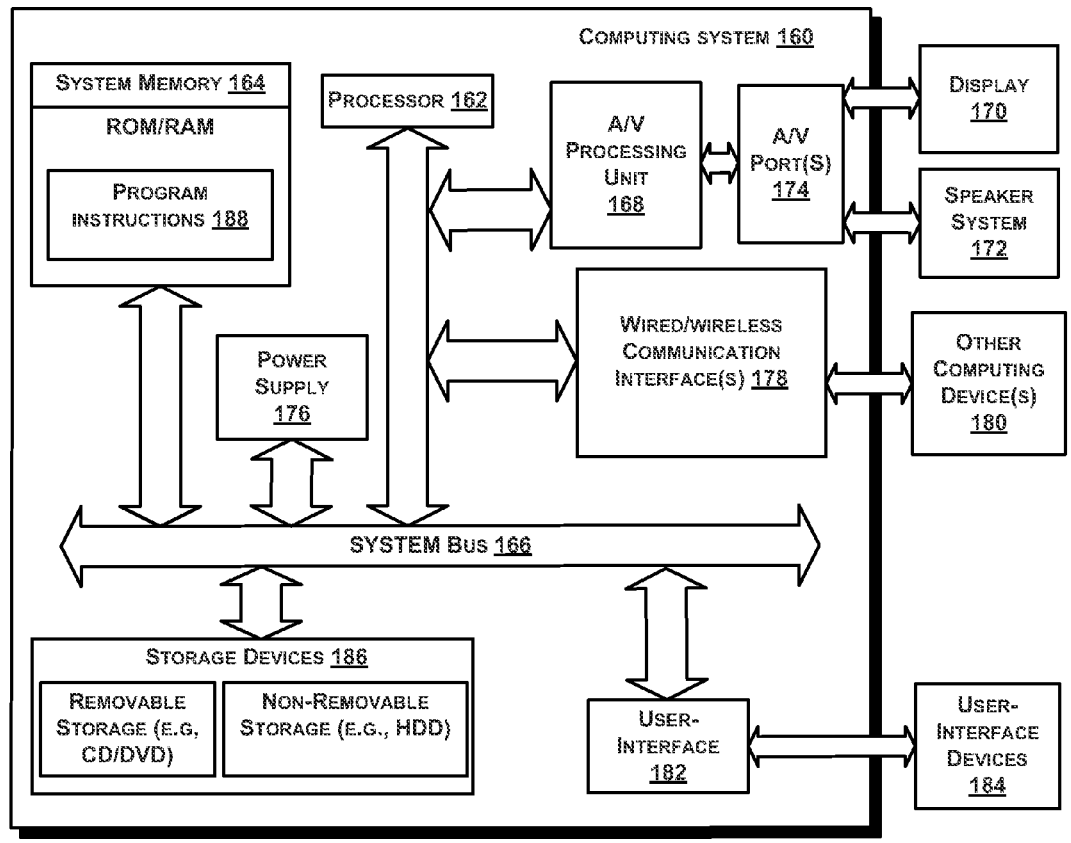
FIG. 8 is a block diagram of an example computing system that may be incorporated into the systems of FIGS. 1-6 and/or the infrastructure of FIG. 7.

As described above in connection with FIGS. 1-6, an example wearable device may include, or may otherwise be communicatively coupled to, a computing system, such as computing system 38, 62, 86, 114. FIG. 8 is a block diagram depicting example components of a computing system 160 in accordance with one non-limiting example. Further, one or both of the device 142 and the remote device 146 of FIG. 7, may include one or more components of the computing system 160.

The computing system 160 may include at least one processor 162 and system memory 164. In the illustrated embodiment, the computing system 160 may include a system bus 166 that communicatively connects the processor 162 and the system memory 164, as well as other components of the computing system. Depending on the desired configuration, the processor 162 can be any type of processor including, but not limited to, a microprocessor (µP), a microcontroller (µC), a digital signal processor (DSP), and the like. Furthermore, the system memory 164 can be of any type of memory now known or later developed including but not limited to volatile memory (such as RAM), non-volatile memory (such as ROM, flash memory, etc.), or any combination thereof.

The computing system 160 of FIG. 8 also includes an audio/video (A/V) processing unit 168 for controlling a display element 170 and a speaker system 172. The display element 170 and the speaker system 172 can be coupled to the computing system 160 by an A/V port 174. In one example, the A/V processing unit 168 and, more particularly, the audio processing components of the unit may include a modulator and a drive amplifier. The modulator is configured to modulate an ultrasonic carrier signal with at least one audio signal and the driver amplifier is configured to amplify the modulated carrier signal. The amplified modulated carrier signal can then be applied through the A/C Port 174 to the speaker system 172, which includes an ultrasonic transducer array configured to radiate the modulated and amplified carrier signal through the air in a narrow beam toward an ear of a user, as described above.

Further, the illustrated computing system 160 includes a power supply 176 and one or more communication interfaces 178 for connecting to and communicating with other computing devices 180. The display element 170 may be arranged to provide a visual depiction of various input regions provided by a user-interface module 182. The user-interface module 182 may be further configured to receive data from and transmit data to, or be otherwise compatible with, one or more user-interface or input devices 184. Such user-interface devices 184 may include a keypad, touch pad, mouse, sensors, and other devices for receiving user input data.

Further, the computing system 160 may also include one or more data storage devices or media 186 implemented in any method or technology for storage of information, such as computer readable instructions, data structures, program modules, or other data. The storage media can include volatile and nonvolatile, removable and non-removable storage media, for example, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium now known or later developed that can be used to store the desired information and which can be accessed by the computing system 160.

Figure 9:
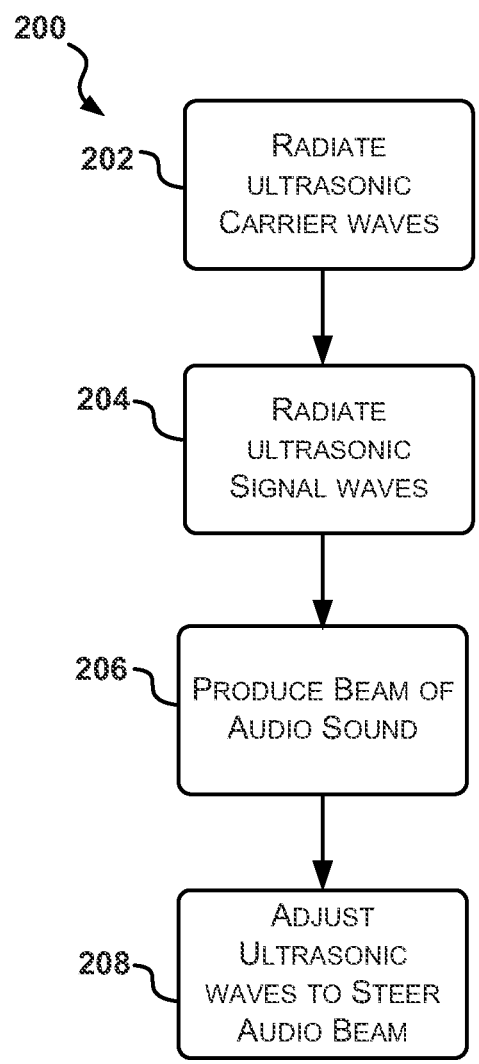
FIG. 9 is a flowchart that represents processes of an example method for generating audio for a user of a head-mountable speaker system.

According to an example embodiment, the computing system 160 may include program instructions 188 stored in the system memory 164 (and/or possibly in another data-storage medium) and executable by the processor 162 to facilitate the various functions described herein including, but not limited to, those functions described with respect to FIG. 9.

Although various components of computing system 160 are shown as distributed components, it should be understood that any of such components may be physically integrated and/or distributed according to the desired configuration of the computing system.

VI. An Example Method

The flowchart of FIG. 9 represents processes of an example method 200 for controlling a wearable speaker system to produce a beam of audible sound that can be heard substantially only by a user of the speaker system. The method 200 can be performed by any of the systems and devices disclosed herein. Further, the method 200 may include one or more operations, functions, or actions as illustrated by one or more of blocks 202-208. Although the blocks 202-208 are illustrated in a sequential order, the blocks may also be performed in parallel, and/or in a different order than described herein. Also, method 200 may include additional or fewer blocks, as needed or desired. For example, the various blocks 202-208 may be combined into fewer blocks, divided into additional blocks, and/or removed based upon a desired implementation.

In addition, each block 202-208 may represent a module, a segment, or a portion of program code, which includes one or more instructions executable by a processor for implementing specific logical functions or steps in the process. The program code may be stored on any type of computer readable medium or storage device including a disk or hard drive, for example. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, and compact-disc read only memory (CD-ROM), for example. The computer readable media may also be any other volatile or non-volatile storage systems. The computer readable medium may be considered a computer readable storage medium, for example, or a tangible storage device. In addition, one or more of the blocks 202-208 may represent circuitry that is wired to perform the specific logical functions of the method 200.

In the method 200 of FIG. 9, at block 202 the speaker system radiates ultrasonic carrier waves from a transducer array and, at block 204, the speaker system radiates ultrasonic signal waves, which include audio data encoded thereon. More particularly, at blocks 202, 204, a control system or audio processor of the speaker system generates ultrasonic carrier signals and audio signals. The carrier signals and the audio signals can then be applied to a transducer array to radiate the corresponding carrier waves and signal waves. In one example, the carrier signals and the audio signals can be combined before being applied to the transducer array or can be applied separately to one or more ultrasonic transducers of the transducer array.

In any event, at block 206, the carrier waves and the signal waves interact with each other and with the air to produce a beam of audible sound, which can be directed to an ear of a user of the wearable speaker system. At the block 208, the ultrasonic carrier and signal waves can be adjusted to steer the beam of audible sound. In one example, a phase of the ultrasonic waves can be adjusted with respect to each other to modify the direction of the beam of audible sound. Although other techniques are also possible and contemplated. The beam steering performed at the block 208 can be performed in response to a user input to adjust the beam of audible sound to be directed to an ear canal of the user.

VII. Conclusion

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus comprising:
   a head-mountable support structure;
   a transducer array coupled to the support structure;
   a processor configured to control the transducer array to radiate ultrasonic waves toward an ear of a user of the head-mountable support structure, wherein the processor is further configured to control the transducer array to radiate a steerable beam of ultrasonic waves; and
   a touchpad coupled to the processor and configured to receive instructions to steer the steerable beam.

2. The apparatus of claim 1, wherein the transducer array is coupled to the support structure such that when the support structure is worn, the transducer array is located in front of an ear and oriented so as to radiate ultrasonic waves towards the ear.

3. The apparatus of claim 1, wherein the transducer array comprises a linear configuration of two or more ultrasonic transducers.

4. The apparatus of claim 1, wherein the support structure comprises an eyeglass frame configuration.

5. The apparatus of claim 4, wherein the support structure comprises a side-arm, and wherein the transducer array is disposed on the side-arm such that when the support structure is worn, the transducer array is located in front of an ear and oriented so as to radiate ultrasonic waves towards the ear.

6. The apparatus of claim 1, wherein the transducer array includes first and second ultrasonic transducers, and wherein the processor is configured to control the first and second ultrasonic transducers to radiate first and second ultrasonic waves, respectively, wherein the first and second ultrasonic waves interact to produce the beam of ultrasonic waves, and further wherein the processor is configured to adjust a phase of the first ultrasonic waves with respect to the second ultrasonic waves to steer the steerable beam.

7. The apparatus of claim 1, wherein the processor is configured to control the transducer array to radiate ultrasonic carrier waves and ultrasonic signal waves, wherein the ultrasonic signal waves include audio signals, and wherein an interaction between the ultrasonic carrier waves and the ultrasonic signal waves are audible.

8. The apparatus of claim 1, further comprising one or more optical elements coupled to the support structure and configured to provide a computer-generated image.

9. A method comprising:
   controlling a transducer array coupled to a head-mountable support structure to radiate ultrasonic carrier waves toward an ear of a user of the head-mountable support structure;
   controlling the transducer array to radiate ultrasonic signal waves toward the ear of the user, wherein the ultrasonic signal waves include audio signals;
   producing a beam of audible sound from an interaction between the ultrasonic carrier waves and the ultrasonic signal waves, wherein the beam of audible sound is radiated toward the ear of the user; and
   receiving instructions, via a touchpad associated with the head-mountable support structure, to steer the beam of audible sound.

10. The method of claim 9, further comprising steering the beam of audible sound by a processor configured to carry out the received instruction.

11. The method of claim 10, wherein steering the beam of audible sound comprises adjusting a phase of the ultrasonic carrier waves with respect to the ultrasonic signal waves.

12. The method of claim 9, wherein the ultrasonic carrier waves and the ultrasonic signal waves are radiated by different ultrasonic transducers of the transducer array.

13. The method of claim 9, further comprising controlling an optical element coupled to the support structure to provide a computer-generated image close to an eye of the user.

14. The method of claim 9, wherein the beam of audible sound originates from a position in front of the user's ear and is radiated back toward the ear of the user.

15. The method of claim 14, wherein the support structure comprises an eyeglass frame configuration that includes a side-arm, and wherein the transducer array is disposed on the side-arm such that when the structure is worn, the transducer array is located in front of the ear and oriented so as to radiate ultrasonic waves back towards the ear.

16. A head-mountable device, comprising;
   a support structure;
   a transducer array coupled to the support structure, wherein the transducer array includes at least a first ultrasonic transducer and a second ultrasonic transducer;
   a processor configured to control the first transducer to radiate ultrasonic carrier waves and to control the second transducer to radiate ultrasonic signal waves, wherein the ultrasonic signal waves includes audio signals, further wherein an interaction between the carrier waves and the signal waves results in a beam of audible sound; and
   a touchpad configured to receive instructions to steer the beam of audible sound.

17. The head-mountable device of claim 16, wherein the processor is further configured to control the first and second transducers to steer the beam of audible sound based on the received instructions.

18. The head-mountable device of claim 17, wherein the processor is configured to adjust a phase of the carrier waves with respect to the signal waves to steer the beam of audible sound.

* * * * *